Patented Oct. 8, 1935

2,016,738

UNITED STATES PATENT OFFICE 2,016,738

BLUE AZO-DYESTUFF

Gérald Bonhôte, Basel, Switzerland, assignor to Society of Chemical Industry in Basle, Basel, Switzerland No Drawing. Original application July 23, 1934, Serial No. 736,613. Divided and this application March 14, 1935, Serial No. 11,167. In Switzerland July 27, 1933

2 Claims. (Cl. 260—95)

In U. S. specification No. 1,871,946 there is described a series of dyestuffs, particularly dyestuffs that dye violet, obtained by coupling arylides of 2,3-hydroxynaphthoic acid with diazo-compounds of the general formula

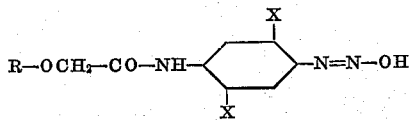

in which R is an aromatic nucleus of the benzene series and both X's are alkoxy.

The present invention relates to the manufacture of blue dyestuffs which are characterized by excellent properties of fastness, by coupling a diazo-compound of the above general formula, in which both X's represent ethoxy, with the anilide of 2,3-hydroxynaphthoic acid.

Consequently, the new dyestuffs have the general formula

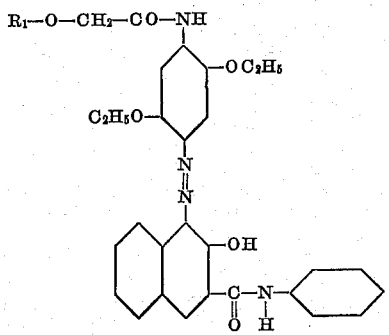

wherein $R_1$ stands for an aromatic nucleus of the benzene series.

Particularly valuable dyeings are obtained when textiles (cotton, wool or silk) are grounded by the known method with the aforesaid arylide and then treated with the diazo-compound of the aforesaid constitution.

The following examples illustrate the invention:—

Example 1

34.4 parts by weight of 4-(4'-methyl)-phenoxyacetylamino-2,5-diethoxy-1-aminobenzene are diazotized as usual and the diazo-solution is introduced into one of 26.3 parts of 2,3-hydroxynaphthoic acid anilide, 50 parts of caustic soda solution of 30 per cent. strength, 30 parts of calcined sodium carbonate and 2000 parts of water. The dyestuff of the formula

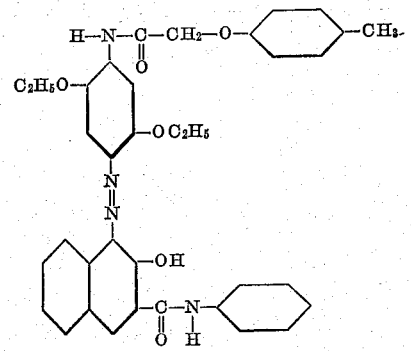

thus formed is immediately precipitated. The blue precipitate is filtered and dried.

Example 2

Cotton yarn is impregnated with a solution of 5 grams of 2,3-hydroxynaphthoic acid-anilide, 10 cc. of caustic soda solution of 34° Bé. and 10 cc. of Turkey red oil, per liter; it is then wrung out and developed in a diazo-solution containing 2 grams of 4-(4'-methyl)-phenoxyacetylamino-2,5-diethoxy-1-aminobenzene, per liter. There is produced a pure blue tint of very good fastness to washing, chlorine, kier-boiling and light.

Example 3

Cotton yarn is impregnated with an alkaline grounding liquor containing per liter 5 grams of 2,3-hydroxynaphthoic acid-anilide and is then well wrung out. It is then developed in a solution containing 2 grams of 4-phenoxyacetylamino-2,5-diethoxy-1-aminobenzene, per liter. There is produced a pure blue tint which is very fast. The formula of the new dyestuff is:—

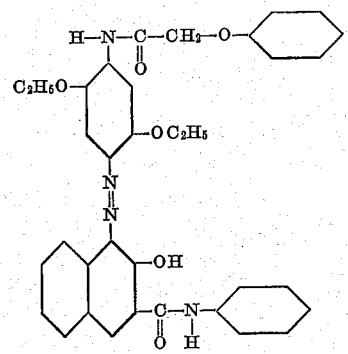

Valuable dyestuffs are also obtained with diazotizing components such as 4-(3'-chloro)- or 4-(4'-methoxy)- or 4-(4'-ethoxy)- or 4-(3'-methoxyl)- or 4-(2'-ethoxy)- or 4-(2'-methoxy)-phenoxyacetylamino-2,5-diethoxy-1-aminobenzene.

What I claim is:—

1. The dyestuffs of the general formula

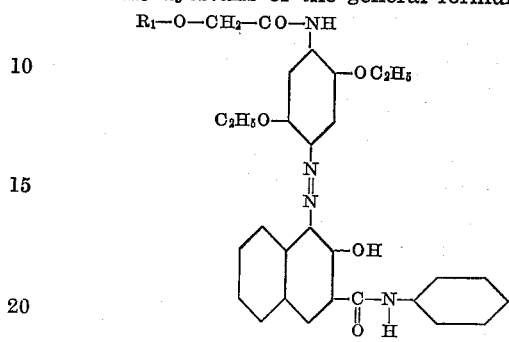

wherein $R_1$ represents an aromatic nucleus of the benzene series, which products form dark powders dissolving in pyridine to blue-violet to blue solutions and dyeing cotton fast blue tints.

2. The azo-dyestuff of the formula

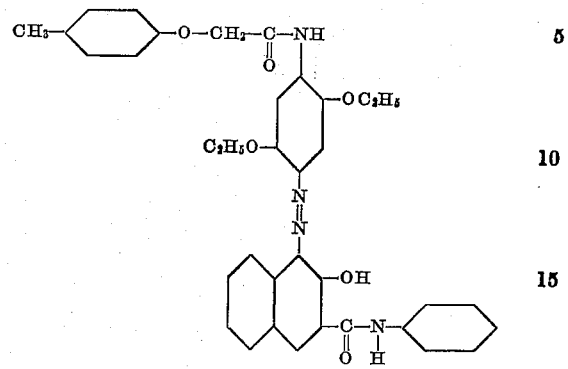

which product dissolves in pyridine to a blue solution and dyes cotton fast blue tints.

GÉRALD BONHÔTE.